(12) United States Patent
Kaji

(10) Patent No.: US 6,999,385 B2
(45) Date of Patent: *Feb. 14, 2006

(54) OPTICAL DISK APPARATUS

(75) Inventor: Toshihiko Kaji, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 486 days.

This patent is subject to a terminal disclaimer.

(21) Appl. No.: 09/979,788

(22) PCT Filed: Mar. 28, 2001

(86) PCT No.: PCT/JP01/02557

§ 371 (c)(1),
(2), (4) Date: Jan. 29, 2002

(87) PCT Pub. No.: WO01/73772

PCT Pub. Date: Apr. 10, 2001

(65) Prior Publication Data

US 2003/0012087 A1  Jan. 16, 2003

(30) Foreign Application Priority Data

Mar. 28, 2000  (JP)  ............................. 2000-89187

(51) Int. Cl.
G11B 7/085  (2006.01)
(52) U.S. Cl. ............... 369/30.1; 369/30.11; 369/44.28
(58) Field of Classification Search ............... 369/30.1, 369/30.11, 44.11, 44.28; G11B 7/085, 7/00
See application file for complete search history.

(56) References Cited

U.S. PATENT DOCUMENTS

| | | | | |
|---|---|---|---|---|
| 4,866,687 A | * | 9/1989 | Kasai et al. | 369/30.15 |
| 5,251,194 A | * | 10/1993 | Yoshimoto et al. | 369/44.26 |
| 5,289,447 A | * | 2/1994 | Kobayashi et al. | 369/44.28 |
| 5,892,742 A | * | 4/1999 | Yamashita et al. | 369/44.27 |
| 6,356,519 B1 | * | 3/2002 | Wakuda et al. | 369/44.28 |

FOREIGN PATENT DOCUMENTS

| | | | |
|---|---|---|---|
| JP | 03-152727 | * | 6/1991 |
| JP | 10-247323 | | 9/1998 |

(Continued)

OTHER PUBLICATIONS

MAT (machine assited translaitioin) of JP 10-275343.*
MAT (machine assited translation) of JP 11-04544.*
MAT (machine assited translation) of JP 10-320791.*

*Primary Examiner*—A M Psitos
(74) *Attorney, Agent, or Firm*—Wenderoth,. Lind & Ponack, L.L.P.

(57) ABSTRACT

An optical disk apparatus which subsidiarily moves a feed at kick seek, thereby performing a tracking control is constituted to calculate a reference feed shifting amount and a compensation amount of the feed shifting on the basis of a lens offset just before starting of the kick seek and the number of tracks on an optical disk by which the lens is moved by the kick seek, further add/subtract the compensation amount to/from the reference feed shifting amount on the basis of the direction of the kick seek, thereby calculating a feed shifting amount, and subsidiarily move the feed by the feed shifting amount in concurrence with the kick seek. Thereby, tracking after the kick seek can be performed stably.

3 Claims, 15 Drawing Sheets

FOREIGN PATENT DOCUMENTS

JP 10-275343    10/1998
JP 10-283643    10/1998

JP 10-320791  * 12/1998
JP 11-45444     2/1999

* cited by examiner feed seek feed seek

OPTICAL DISK APPARATUS

TECHNICAL FIELD

The present invention relates to an optical disk apparatus typified by a CD-ROM drive and, more particularly, to an optical disk apparatus which subsidiarily moves a feed at kick seek when data is read from an arbitrary position on an optical disk surface, thereby performing a tracking control.

BACKGROUND ART

In recent years, standard mounting of an optical disk apparatus on a personal computer has been rapidly progressed, and accordingly the optical disk apparatus as well as a hard disk drive have become indispensable to the personal computer. Initially the CD-ROM drive has constituted the majority of the optical disk apparatus, while nowadays a DVD-ROM drive having a larger capacity than the CD-ROM drive, or a writable or rewritable CD-R/CD-RW drive is normally mounted on the personal computer, and further a DVD-R or DVD-RAM drive comes on a market. As described above, the efficiency and function of the optical disk apparatus has been enhanced continuously.

FIG. 10 is a schematic diagram illustrating a whole conventional optical disk apparatus. In the figure, numeral 11 denotes a disk, numeral 12 denotes a spindle motor, numeral 13 denotes a pickup, numeral 14 denotes a lens, numeral 15 denotes a feed, numeral 16 denotes a feed motor, numeral 17 denotes a driver IC, numeral 18 denotes an analog front end IC, numeral 19 denotes a digital signal processor IC, numeral 20 denotes a decoder, numeral 21 denotes a CPU, and numeral 22 denotes a host.

FIG. 11 is an explanation drawing illustrating a constitution of a pickup of an optical disk apparatus. In the figure, numeral 13 denotes a pickup, numeral 14 denotes a lens, and numerals 25 and 26 denote wires for supporting the lens 14 in a housing of the pickup 13.

Next, a data reading operation of the optical disk apparatus will be described.

The disk 11 is controlled by the spindle motor 12 for rotating at a constant linear velocity or a constant angular velocity. The pickup 13, moving from the inner track side to the outer track side in the radial direction of the disk 11, applies a laser beam to the surface of the disk 11 and receives light reflected therefrom, thereby reading data on the disk 11. Data called pit are spirally recorded on the disk 11, and the number of the spirals in the radial direction is referred to as the number of tracks. To accurately read the data on the disk 11, the pickup 13 drives the lens 14 in a direction perpendicular to the disk surface, thereby focusing the laser beam onto the disk 11. Further, the pickup 13 receives the reflected light from the disk 11 and detects a deviation from the center of a track. A tracking control for moving the lens 14 horizontally in the radial direction of the disk 11 is performed so that the deviation is eliminated and the laser beam is applied to the center of the track. When the lens 14 is a prescribed distance or more apart from the center of the housing, the feed 15 to which the pickup 13 is fixed is moved to return the lens 14 to the center of the housing. A focus and tracking control of the lens 14 is performed by the driver 17 according to a command of the CPU 21, and the data which are accurately read are transferred to the host 22 via the analog front end IC 18, the digital signal processor IC 19 and the decoder IC 20.

Next, influence which are exerted by the deviation of the lens in the pickup upon the data reading operation will be described with reference to FIG. 12.

FIG. 12 is a diagram for explaining the influences exerted by the deviation of the lens in the pickup upon the data reading. In the figure, numeral 11 denotes the disk, numerals 32 and 33 denote lenses, numeral 34 denotes a laser, and numeral 35 denotes a photo acceptance element.

The lens 32, which is located at the center in the pickup, refracts light from the laser 34, thereby obtaining a focus on the disk 11. Then, the disk 11 returns a reflected light to the photo acceptance element 35. However, the lens 33, which is in a position deviated from the center in the pickup, may cause the reflected light from the disk 11 to be out of the photo acceptance unit 35, as shown by a dotted line in FIG. 12. In this case, a tracking servo cannot generate a signal for detecting a position on the basis of the reflected light from the disk 11. Therefore, the optical disk apparatus cannot read data accurately due to the deviation of the lens, resulting in unstable tracking.

Next, a seek operation for accurately performing the data reading operation will be described.

The optical disk apparatus performs the seek operation to read data accurately.

In this operation, when the pickup 13 is moved to an arbitrary position on the disk 11 in accordance with a command from the outside such as the host 22, the number of tracks from the current read position to a target position is obtained by calculation, and the pickup 13 or the lens 14 is moved by the obtained number of tracks, thereby adjusting the reading position. This seek operation has two kinds of operation, i.e., feed seek and kick seek. The feed seek is one which moves the feed 15 to move the pickup 13 to a target position, which is employed for a relatively long-distance movement. The kick seek is one which moves the lens 14 after the feed seek in the housing of the pickup 13 to reach a track in a target position, which is employed for a relatively short-distance movement.

Here, the feed seek will be described with reference to FIGS. 11 and 13.

FIGS. 13(a) and 13(b) are diagrams for explaining positional changes of the lens at the feed seek, FIG. 13(a) illustrating a case where the feed is moved in an inner radial direction and FIG. 13(b) illustrating a case where the feed is moved in an outer radial direction. In the figure, numeral 13 denotes a pickup, numeral 14 denotes a lens, and numeral 15 denotes a feed.

The conventional optical disk apparatus is quite vulnerable to external vibrations or the like, because the lens 14 is supported by wires 25 and 26 in the pickup 13 as shown in FIG. 11. However, since the feed seek may be likened a kind of external vibrations, the lens 14 may be adversely deviated from the center of the pickup. 13 as shown in FIG. 13 when the feed seek is excessively accelerated or decelerated.

Next, the kick seek will be described with reference to FIGS. 14 and 15.

FIGS. 14(a) and 14(b) are diagrams for explaining positional changes of the lens at the kick seek, FIG. 14(a) illustrating a state before the kick seek and FIG. 14(b) illustrating a state after the kick seek. In the figure, numeral 13 denotes a pickup and numeral 14 denotes a lens.

In the conventional optical disk apparatus, when the lens 14 performs the kick seek from the central position in the pickup 13, the lens 14 is deviated in the pickup 13 by the kick seek as shown by a dotted line in FIG. 14(a) unless the feed 15 is subsidiarily moved. However, since the driver 17 drives the feed motor 16, thereby subsidiarily moving the feed 15 by a reference feed shifting amount F0, the lens 14 is located at the center in the pickup 13 after the kick seek. This reference feed shifting amount F0 is calculated by the CPU 21, and its calculating means will be described hereinafter.

FIG. 15 is a block diagram illustrating a means for calculating the feed shifting amount in the CPU of the conventional optical disk apparatus. In the figure, numeral 3 denotes a number-of-kick-seek-tracks calculating means for calculating the number of tracks by which the lens is moved at the kick seek, and numeral 5 denotes a reference feed shifting amount calculating means for calculating the quantity by which the feed is subsidiarily moved at the kick seek.

In the figure, the number-of-kick-seek-tracks calculating means 3 calculates the number of kick seek tracks on the basis data of the current position and a target position of the lens 14, just before the kick seek starts, which corresponds to a moving distance of the lens 14 at the kick seek. The reference feed shifting amount calculating means 5 calculates the reference feed shifting amount on the basis of the number of kick seek tracks, and outputs the calculated amount to the driver 17.

Problems of the conventional optical disk apparatus will be described with reference to FIGS. 16 and 17.

FIGS. 16(a) and 16(b) are diagrams for explaining problems at the kick seek from a state where the lens is deviated, FIG. 16(a) illustrating a state before the kick seek and FIG. 16(b) illustrating a state after the kick seek. In the figure, numeral 13 denotes a pickup and numeral 14 denotes a lens.

In the conventional optical disk apparatus, when the kick seek is performed from a state where the lens 14 is deviated in the pickup 13, the lens 14 is located at the center in the pickup 13 as shown by a dotted line in FIG. 16(a). Further, when the feed is subsidiarily moved by the reference feed shifting amount F0, the lens 14 is returned to the deviated state before the kick seek again, as shown in FIG. 16(b). As described above, in the conventional optical disk apparatus, even when the kick seek is performed from a state where the lens 14 is deviated in the pickup 13 and the feed is subsidiarily moved by the reference feed shifting amount F0, the deviated state of the lens 14 as before the kick seek is merely retained and the deviation of the lens 14 is not at all eliminated also after the kick seek as shown in FIG. 16(b).

FIGS. 17(a) and 17(b) are diagrams for explaining problems at kick seek from a state where the feed keeps moving by the inertia of feed seek, FIG. 17(a) illustrating a state after the feed seek and FIG. 17(b) illustrating a state after the kick seek. In the figure, numeral 13 denotes a pickup and numeral 14 denotes a lens.

In the conventional optical disk apparatus, even when the lens 14 is located at the central position of the pickup 13 after the feed seek, when the kick seek is performed from a state where the feed keeps moving by the inertia of the feed seek before the kick seek and the feed is subsidiarily moved for the reference feed shifting amount, the lens 14 is deviated in the pickup 13 as shown in FIG. 17(b). When acceleration or deceleration of the feed seek is excessive, the inertia of the feed seek is increased, whereby this is easier to occur.

The present invention is made to solve the above-mentioned problems and has for its object to provide an optical disk apparatus in which a lens is located at the center in a housing of a pickup after the kick seek, thereby enabling to perform subsequent tracking stably.

DISCLOSURE OF THE INVENTION

To solve the above-described problems, according to a first aspect of the present invention, there is provided an optical disk apparatus which subsidiarily moves a feed at kick seek when data is read from an arbitrary position on an optical disk surface, thereby performing a tracking control, comprising: a pre-kick-seek offset calculating means for calculating an offset of a lens on the basis of a position of the lens in a pickup just before the kick seek starts; a kick seek direction judging means for judging whether a direction of the kick seek is an inner radial direction or an outer radial direction on the basis of a current position and a target position of the lens just before the kick seek starts; a number-of-kick-seek-tracks calculating means for calculating the number of tracks on an optical disk by which the lens is moved by the kick seek; a reference feed shifting amount calculating means for calculating a reference feed shifting amount on the basis of the number of tracks calculated by the number-of-kick-seek-tracks calculating means; a compensation amount calculating means for calculating a compensation amount by multiplying the offset calculated by the pre-kick-seek offset calculating means by a compensation coefficient; a feed shifting amount calculating means for adding the compensation amount and the reference feed shifting amount when the direction is judged to be the inner radial direction by the kick seek direction judging means, and subtracting the compensation amount from the reference feed shifting amount when it is judged to be the outer radial direction, thereby calculating a feed shifting amount; and a control means for subsidiarily moving the feed by the feed shifting amount in concurrence with the kick seek.

According to the invention, the lens is located at the center in a housing of the pickup after the kick seek, whereby subsequent tracking can be stably performed.

According to a second aspect of the present invention, there is provided an optical disk apparatus which subsidiarily moves a feed at kick seek when data is read from an arbitrary position on an optical disk surface, thereby performing a tracking control, comprising: a number-of-feed-seek-tracks calculating means for calculating the number of tracks on an optical disk by which a lens is moved by feed seek before the kick seek; a kick seek direction judging means for judging whether a direction of the kick seek is an inner radial direction or an outer radial direction on the basis of a current position and a target position of the lens just before the kick seek starts; a number-of-kick-seek-tracks calculating means for calculating the number of tracks on an optical disk by which the lens is moved by the kick seek; a reference feed shifting amount calculating means for calculating a reference feed shifting amount on the basis of the number of tracks calculated by the number-of-kick-seek-tracks calculating means; a compensation amount calculating means for calculating a compensation amount by multiplying the number of tracks calculated by the number-of-feed-seek-tracks calculating means by a compensation coefficient; a feed shifting amount calculating means for adding the compensation amount and the reference feed shifting amount when the direction is judged to be the inner radial direction by the kick seek direction judging means, and subtracting the compensation amount from the reference feed shifting amount when it is judged to be the outer radial direction, thereby calculating a feed shifting amount; and a control means for subsidiarily moving the feed by the feed shifting amount in concurrence with the kick seek.

According to the invention, even when the movement of the feed seek remains as the inertia, the lens is located at the center in a housing of the pickup after the kick seek, whereby subsequent tracking can be performed stably.

According to a third aspect of the present invention, there is provided an optical disk apparatus which subsidiarily moves a feed at kick seek when data is read from an arbitrary position on an optical disk surface, thereby performing a tracking control, comprising: a post-feed-seek offset calculating means for calculating an offset of a lens on the basis of a position of the lens in a pickup just after an end of feed seek before the kick seek; a pre-kick-seek offset calculating means for calculating an offset of the lens on the basis of the position of the lens in the pickup just before the kick seek starts; a kick seek direction judging means for judging whether a direction of the kick seek is an inner radial direction or an outer radial direction on the basis of a current position and a target position of the lens just before the kick seek starts; a number-of-kick-seek-tracks calculating means for calculating the number of tracks on an optical disk by which the lens is moved by the kick seek; a reference feed shifting amount calculating means for calculating a reference feed shifting amount on the basis of the number of tracks calculated by the number-of-kick-seek-tracks calculating means; a compensation amount calculating means for calculating a compensation amount by multiplying a difference between the offset calculated by the pre-kick-seek offset calculating means and the offset calculated by the post-feed-seek offset calculating means, by a compensation coefficient; a feed shifting amount calculating means for adding the compensation amount and the reference feed shifting amount when the direction is judged to be the inner radial direction by the kick seek direction judging means, and subtracting the compensation amount from the reference feed shifting amount when it is judged to be the outer radial direction, thereby calculating a feed shifting amount; and a control means for subsidiarily moving the feed by the feed shifting amount in concurrence with the kick seek.

According to the invention, even when the movement of the feed seek remains as the inertia, the lens is located at the center in a housing of the pickup after the kick seek, whereby subsequent tracking can be performed stably.

According to a fourth aspect of the present invention, in the optical disk apparatus as defined in any of the first through third aspects, an absolute value of the compensation amount is smaller than an absolute value of the reference feed shifting amount.

According to the invention, the lens does not move in a direction opposite to the direction along which the pickup moves at the kick seek and the relative velocity between the lens and the pickup is reduced, thereby realizing more stable tracking.

According to a fifth aspect of the present invention, in the optical disk apparatus as defined in any of the first through third aspects, the compensation coefficient is proportional to the number of tracks calculated by the number-of-kick-seek-tracks calculating means.

According to the invention, when the number of kick seek tracks is small and the seek operation is continued, the feed shifting amount is adjusted according to the number of kick seek tracks, and vibrations or resonance of the mechanism caused by subsidiarily moving the feed more than the lens deviation by the kick seek are suppressed, thereby realizing more stable tracking.

BEST MODE TO EXECUTE THE INVENTION (Embodiment 1)

Figure 1:
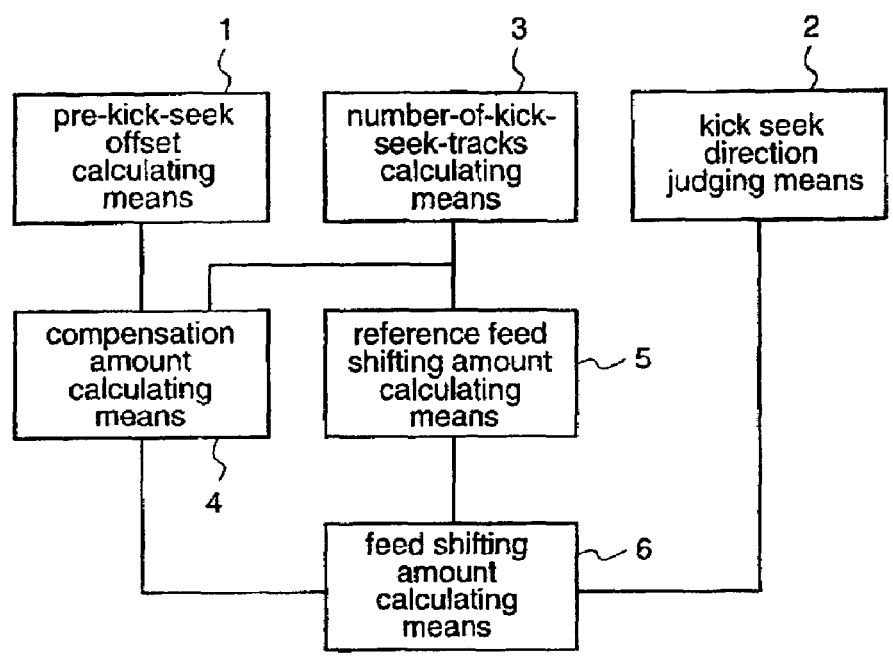
FIG. 1 is a block diagram illustrating a means for calculating a feed shifting amount of an optical disk apparatus according to a first embodiment of the present invention.

FIG. 1 is a block diagram illustrating a means for calculating a feed shifting amount of an optical disk apparatus according to a first embodiment of the present invention. In the figure, numeral 1 denotes a pre-kick-seek offset calculating means for calculating an offset of a lens before kick seek, numeral 2 denotes a kick seek direction judging means for judging a direction of kick seek, numeral 4 denotes a compensation amount calculating means for calculating the amount of compensation of a reference feed shifting amount, and numeral 6 denotes a feed shifting amount calculating means for calculating the amount of a subsidiary movement of a feed, and these are implemented by software on a CPU.

A number-of-kick-seek-tracks calculating means 3 and a reference feed shifting amount calculating means 5 in the optical disk apparatus according to the first embodiment are the same as those denoted by the same reference numerals in the conventional optical disk apparatus.

Next, the operation will be described.

Just before kick seek starts, the pre-kick-seek offset calculating means 1 receives data of the quantity of deviation of a lens 14 from the center of a housing of a pickup 13 from the analog front end IC 18, A/D-converts the data to calculate an offset before kick seek, and outputs the calculated offset to the compensation amount calculating means 4. Simultaneously, the kick seek direction judging means 2 judges whether the direction of kick seek is an inner radial direction or an outer radial direction on the basis of the current position and a target position of the lens 14, and outputs the obtained result to the feed shifting amount calculating means 6. On the other hand, just before the kick seek starts, the number-of-kick-seek-tracks calculating means 3 calculates the number of kick seek tracks that corresponds to a moving distance of the lens 14 on the basis of the current position and the target position of the lens 14, and outputs the obtained number to the reference feed shifting amount calculating means 5 and the compensation amount calculating means 4. The reference feed shifting amount calculating means 5 calculates a reference feed shifting amount on the basis of the number of kick seek tracks and outputs the obtained amount to the feed shifting amount calculating means 6. The compensation amount calculating means 4 calculates a compensation amount by multiplying a coefficient which is proportional to the number of kick seek tracks by the offset before kick seek, and outputs the obtained compensation amount to the feed shifting amount calculating means 6. The feed shifting amount calculating means 6 adds the compensation amount and the reference feed shifting amount in the case of kick seek in the inner radial direction, while subtracting the compensation amount from the reference feed shifting amount in the case of kick seek in the outer radial direction, thereby calculating a feed shifting amount. When the calculated feed shifting amount is smaller than 0, the feed shifting amount is outputted as 0.

Therefore, assuming that "F" is the feed shifting amount, "F0" is the reference feed shifting amount, "offset" is the offset before kick seek, "α" is the coefficient (α=γT), "γ" is the coefficient, "T" is the number of kick seek tracks, the feed shifting amount has no polarity, and the polarity of the offset is "+" in the inner radial direction and "−" in the outer radial direction, the feed shifting amount at kick seek is decided in the CPU 21 as a whole by the following expressions:

In the case of kick seek in the inner radial direction
$F=F0+\alpha$ offset ($F=0$, when $F0+\alpha$ offset$<0$)

In the case of kick seek in the outer radial direction
$F=F0-\alpha$ offset ($F=0$, when $F0-\alpha$ offset$<0$)

Next, the functions will be described with reference to FIGS. 2 and 3.

Figure 2A:
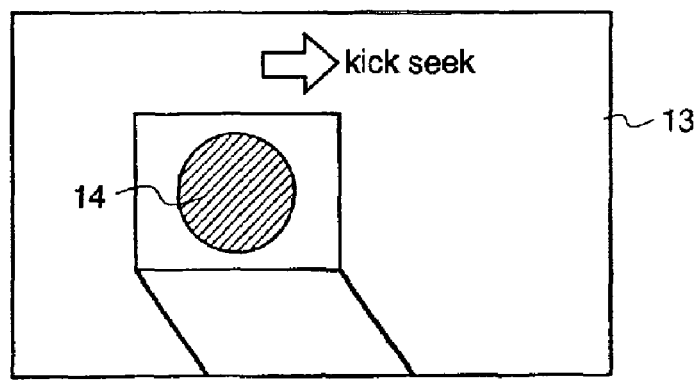
FIGS. 2(a)–2(c) are diagrams for explaining a case where kick seek is performed in an outer radial direction from a state where a lens is deviated in an inner radial direction in the first embodiment of the invention.
Figure 2B:
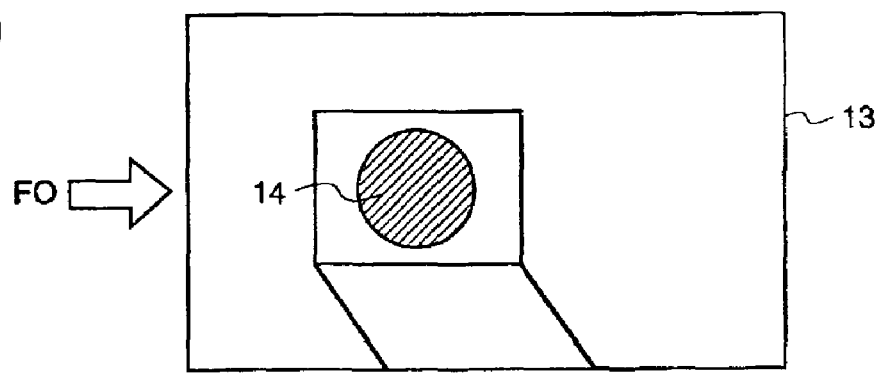
Figure 2C:
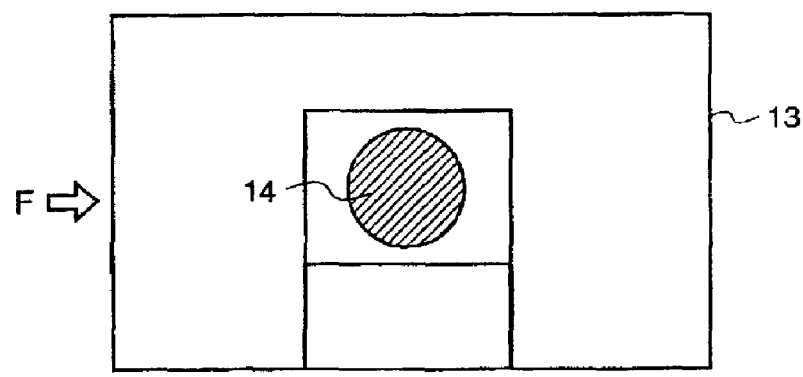

FIGS. 2(*a*)–2(*c*) are diagrams for explaining a case where kick seek is performed in the outer radial direction from a state where the lens is deviated in the inner radial direction, in which FIG. 2(*a*) shows a state before the kick seek, FIG. 2(*b*) shows a state after kick seek by the reference feed shifting amount, and FIG. 2(*c*) shows a state after kick seek by the feed shifting amount.

In the figure, when the amount of a subsidiary movement of the feed at the kick seek is the reference feed shifting amount which is calculated on the basis of the number of kick seek tracks, the deviation of the lens 14 is not at all eliminated as shown in FIG. 2(*b*). In the optical disk apparatus according to the first embodiment, the feed shifting amount F is smaller than the reference feed shifting amount F0 (0<F<F0). Accordingly, the amount of the lens movement with respect to the feed shifting amount of kick seek is large, whereby the lens 14 is located at the center of the pickup 13 as shown in FIG. 2(*c*). The same thing can be said of a case where the kick seek is performed in the inner radial direction from a state where the lens 14 is deviated in the outer radial direction.

Figure 3A:
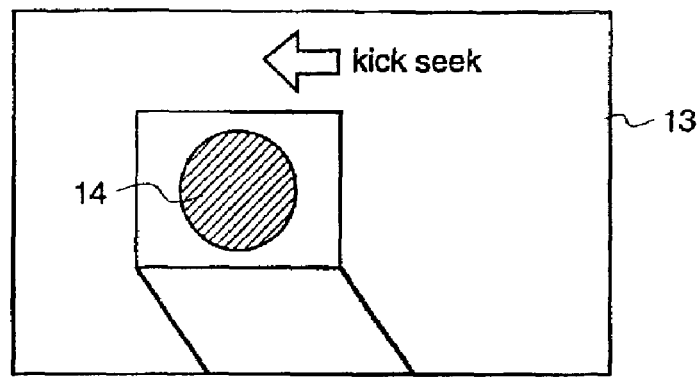
FIGS. 3(a)–3(c) are diagrams for explaining a case where kick seek is performed in an inner radial direction from a state where the lens is deviated in the inner radial direction in the first embodiment of the invention.
Figure 3B:
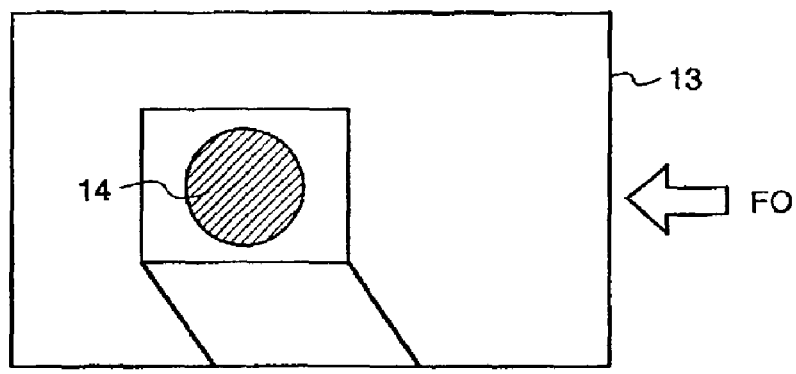
Figure 3C:
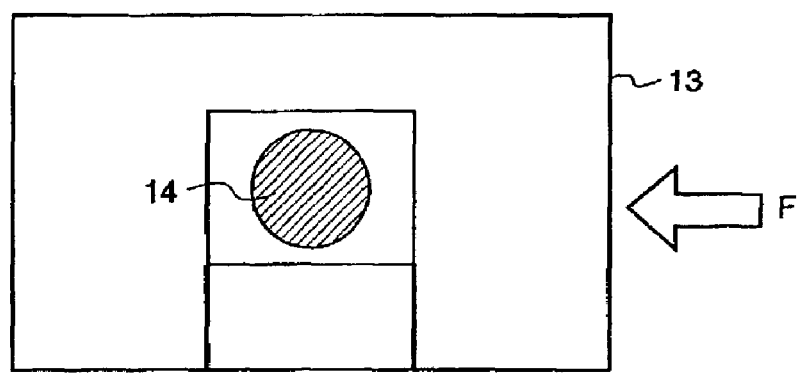

FIGS. 3(*a*)–3(*c*) are diagrams for explaining a case where kick seek is performed in the inner radial direction from a state where the lens is deviated in the inner radial direction, in which FIG. 3(*a*) shows a state before the kick seek, FIG. 3(*b*) shows a state after kick seek by the reference feed shifting amount, and FIG. 3(*c*) shows a state after kick seek by the feed shifting amount.

In the figure, when the amount of a subsidiary movement of the feed at the kick seek is the reference feed shifting amount which is calculated on the basis of the number of kick seek tracks, the deviation of the lens 14 is not at all eliminated as shown in FIG. 3(*b*). On the other hand, in the optical disk apparatus according to the first embodiment, the feed shifting amount F is larger than the reference feed shifting amount F0 (0<F0<F). Thus, the lens 14 is located at the center of the pickup 13 as shown in FIG. 3(*c*). The same thing can be said of a case where the kick seek is performed in the outer radial direction from a state where the lens 14 is deviated in the outer radial direction.

As described above, the optical disk apparatus according to the first embodiment of the invention calculates a feed shifting amount on the basis of the lens offset just before the start of kick seek, the direction of the kick seek and the number of tracks on an optical disk by which the lens is moved at the kick seek, and subsidiarily moves the feed by the feed shifting amount in concurrence with the kick seek. Therefore, the lens is located at the center in the housing of the pickup after the kick seek, whereby subsequent tracking can be performed stably.

Further, according to the optical disk apparatus of the first embodiment of the invention, the absolute value of the compensation amount is smaller than the absolute value of the reference feed shifting amount. Therefore, at the kick seek, the lens does not move in a direction opposite to the direction along which the pickup moves, and the relative velocity between the lens and the pickup is reduced, thereby realizing more stable tracking.

Further, in the optical disk apparatus according to the first embodiment of the invention, the compensation coefficient at the calculation of the compensation amount is proportional to the number of kick seek tracks. Therefore, when the number of kick seek tracks is small and the seek operation is continued, the feed shifting amount is adjusted according to the number of kick seek tracks, and vibrations or resonance of the mechanism caused by subsidiarily moving the feed more than the lens deviation by kick seek are reduced, resulting in more stable tracking.

(Embodiment 2)

Figure 4:
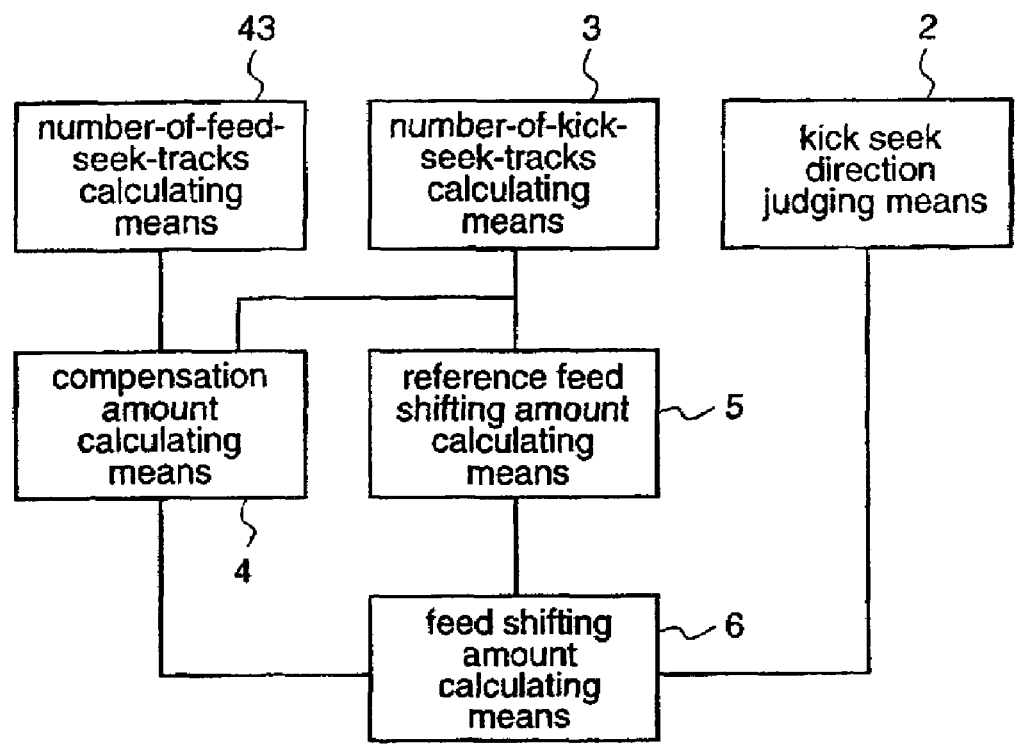
FIG. 4 is a block diagram illustrating a means for calculating a feed shifting amount of an optical disk apparatus according to a second embodiment of the present invention.

FIG. 4 is a block diagram illustrating a means for calculating a feed shifting amount of an optical disk apparatus according to a second embodiment of the present invention. In the figure, numeral 43 denotes a number-of-feed-seek-tracks calculating means for calculating the number of tracks by which the lens is moved at feed seek before kick seek. This is implemented by software in the CPU.

A kick seek direction judging means 2, a number-of-kick-seek-tracks calculating means 3, a compensation amount calculating means 4, a reference feed shifting amount calculating means 5, and a feed shifting amount calculating means 6 in the optical disk apparatus according to the second embodiment are the same as those denoted by the same reference numerals in the optical disk apparatus according to the first embodiment.

Next, the operation will be described.

The kick seek direction judging means 2 judges whether the direction of kick seek is an inner radial direction or an outer radial direction on the basis of the current position and a target position of the lens 14, and outputs the obtained direction to the feed shifting amount calculating means 6. The number-of-feed-seek-tracks calculating means 43 calculates the number of feed seek tracks that corresponds to a moving distance of the lens 14 on the basis of positions of the lens 14 before and after the feed seek, and outputs the obtained number to the compensation amount calculating means 4, just before the kick seek starts. On the other hand, the number-of-kick-seek-tracks calculating means 3 calculates the number of kick seek tracks that corresponds to a moving distance of the lens 14 on the basis of the current position and the target position of the lens 14, and outputs the obtained number to the reference feed shifting amount calculating means 5 and the compensation amount calculating means 4, just before the kick seek starts. The reference feed shifting amount calculating means 5 calculates a reference feed shifting amount on the basis of the number of kick seek tracks and outputs the obtained amount to the feed shifting amount calculating means 6. The compensation amount calculating means 4 calculates a compensation amount by multiplying a coefficient which is proportional to the number of kick seek tracks by the number of feed seek tracks, and outputs the calculated compensation amount to the feed shifting amount calculating means 6. The feed shifting amount calculating means 6 adds the compensation amount and the reference feed shifting amount in the case of kick seek in the inner radial direction, while subtracting the compensation amount from the reference feed shifting amount in the case of kick seek in the outer radial direction, thereby calculating a feed shifting amount. When the calculated feed shifting amount is smaller than 0, the feed shifting amount is outputted as 0.

Therefore, in the CPU 21 as a whole, assuming that "$F$" is the feed shifting amount, "$F0$" is the reference feed shifting amount, "track" is the number of feed seek tracks, "$\beta$" is the coefficient ($\beta = \kappa T$), "$\kappa$" is the coefficient, "$T$" is the number of kick seek tracks, the feed shifting amount has no polarity, and the polarity of the track is "−" in the inner radial direction and "+" in the outer radial direction, the feed shifting amount at kick seek is decided by the following expressions:

In the case of kick seek in the inner radial direction $F = F0 + \beta$ track ($F=0$, when $F0+\beta$ track$<0$)

In the case of kick seek in the outer radial direction $F = F0 - \beta$ track ($F=0$, when $F0-\beta$ track$<0$)

Next, the functions will be described with reference to FIGS. 5 and 6.

Figure 5A:
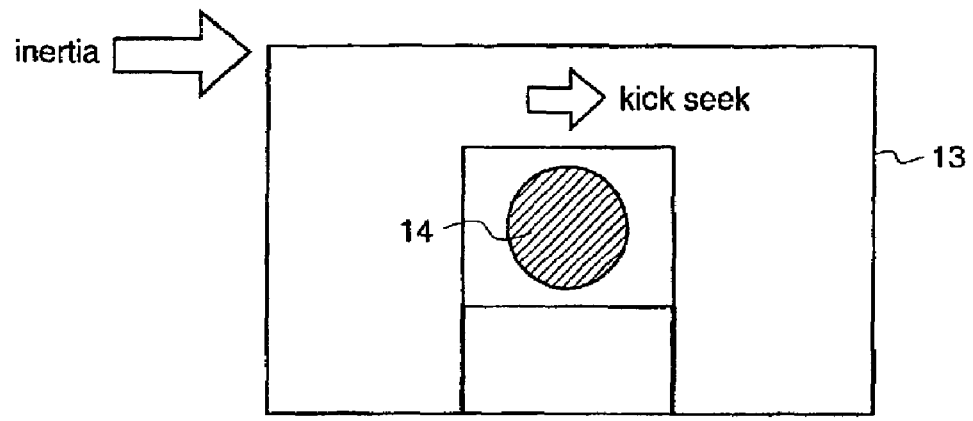
FIGS. 5(a)–5(c) are diagrams for explaining a case where kick seek is performed in an outer radial direction from a state where feed seek in the outer radial direction is ended in the second embodiment of the invention.
Figure 5B:
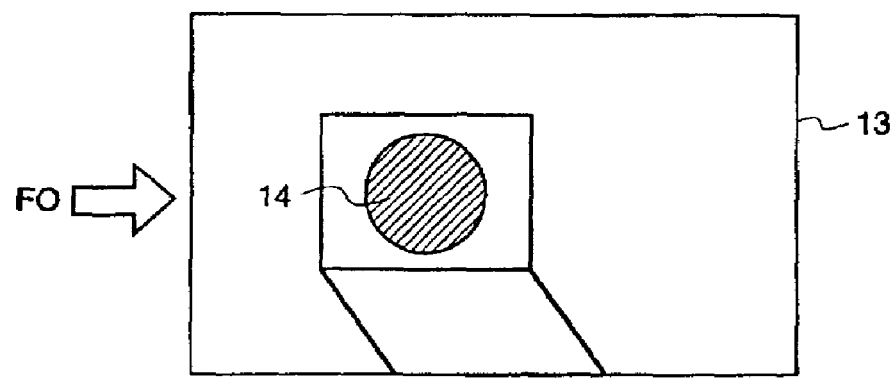
Figure 5C:
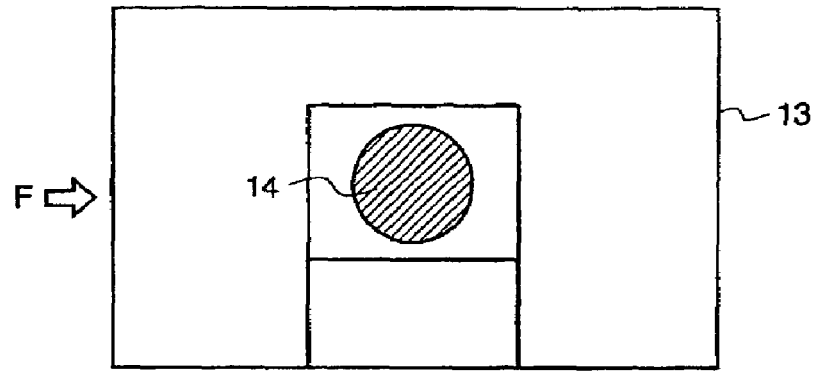

FIGS. 5(*a*)–5(*c*) are diagrams for explaining a case where kick seek is performed in the outer radial direction from a state where feed seek in the outer radial direction is ended, in which FIG. 5(*a*) shows a state before kick seek, FIG. 5(*b*) show a state after kick seek by the reference feed shifting amount, and FIG. 5(*c*) shows a state after kick seek by the feed shifting amount.

When acceleration or deceleration of the feed seek is excessive, the movement of the feed may remain as the inertia even after the feed seek is ended. In this case, when the kick seek by the reference feed shifting amount is performed, the amount of subsidiary movement of the feed becomes excessive and the lens 14 is deviated according to the amount of movement of the lens 14 at the kick seek, as shown in FIG. 5(*b*). On the other hand, in the optical disk apparatus according to the second embodiment, the feed shifting amount F is smaller than the reference feed shifting amount F0 (0<F<F0). Thus, the lens 14 is located at the center of the pickup 13 as shown in FIG. 5(*c*). The same thing can be said of a case where the kick seek is performed in the inner radial direction from a state where feed seek in the inner radial direction is ended.

Figure 6A:
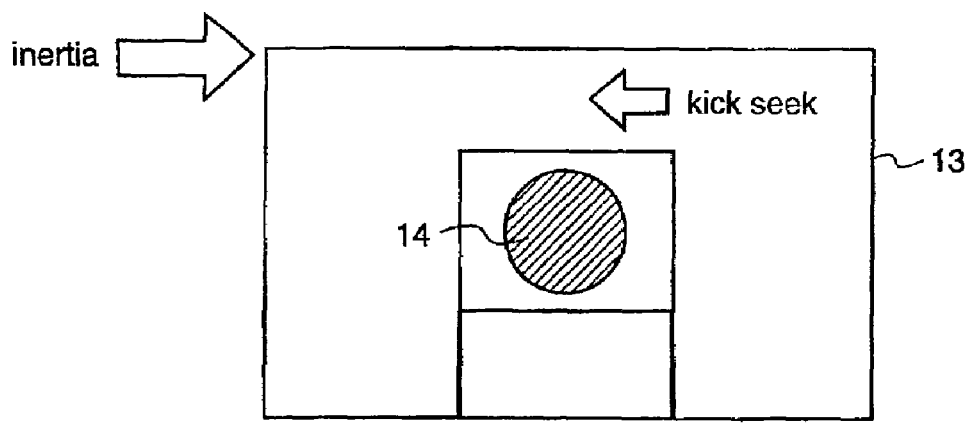
FIGS. 6(a)–6(c) are diagrams for explaining a case where kick seek is performed in an inner radial direction from a state where feed seek in an outer radial direction is ended in the second embodiment of the invention.
Figure 6B:
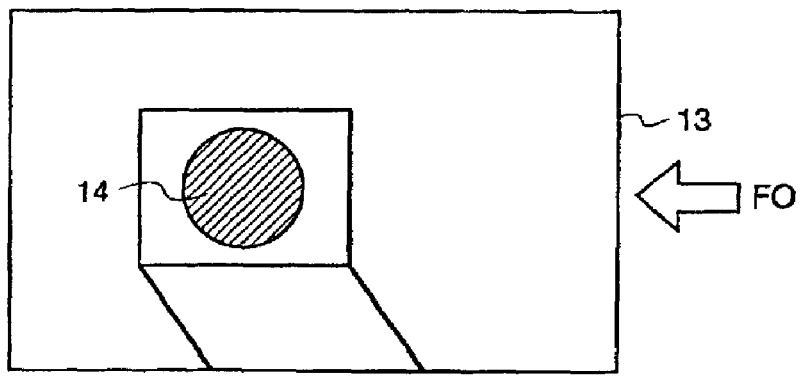
Figure 6C:
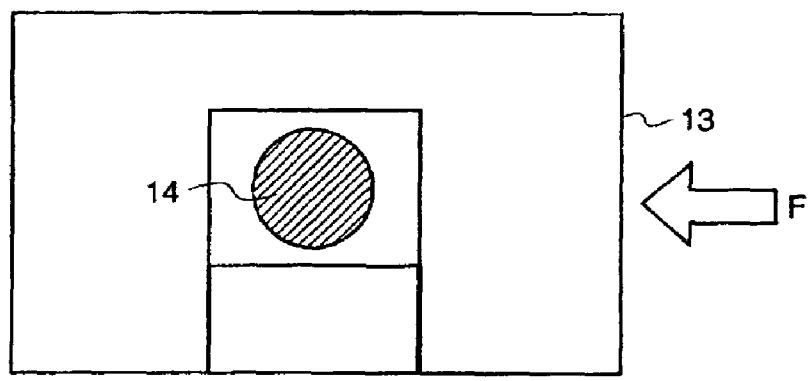

FIGS. 6(*a*)–6(*c*) are diagrams for explaining a case where the kick seek is performed in the inner radial direction from a state where feed seek in the outer radial direction is ended, in which FIG. 6(*a*) shows a state before kick seek, FIG. 6(*b*) shows a state after kick seek by the reference feed shifting amount, and FIG. 6(*c*) shows a state after kick seek by the feed shifting amount.

In a case where the movement of the feed remains as the inertia even after the feed seek is ended, when the kick seek by the reference feed shifting amount is performed, the amount of feed movement caused by the inertia and the reference feed shifting amount cancel each other, and the lens 14 is deviated according to the amount of movement of the lens 14 at the kick seek, as shown in FIG. 6(*b*). On the other hand, in the optical disk apparatus according to the second embodiment, the feed shifting amount F is larger than the reference feed shifting amount F0 (0<F0<F). Thus, the lens 14 is located at the center of the pickup 13 as shown in FIG. 6(*c*). The same thing can be said of a case where the kick seek is performed in the outer radial direction from a state where the feed seek in the inner radial direction is ended.

As described above, the optical disk apparatus according to the second embodiment of the invention calculates the feed shifting amount on the basis of the number of tracks on an optical disk by which the lens is moved by feed seek before kick seek, the direction of the kick seek, and the number of tracks on the optical disk by which the lens is moved by the kick seek, and subsidiarily moves the feed by the feed shifting amount in concurrence with the kick seek. Therefore, the lens is located at the center in the housing of the pickup after the kick seek even when the movement of feed seek remains as the inertia, whereby subsequent tracking can be stably performed.

Further, in the optical disk apparatus according to the second embodiment of the invention, the absolute value of the compensation amount is smaller than the absolute value of the reference feed shifting amount. Therefore, the lens does not move in a direction opposite to the direction along which the pickup moves at the kick seek, and the relative velocity between the lens and the pickup is reduced, resulting in more stable tracking.

Further, in the optical disk apparatus according to the second embodiment of the invention, the compensation coefficient at the calculation of the compensation amount is proportional to the number of kick seek tracks. Therefore, when the number of kick seek tracks is small and the seek operation is continued, the feed shifting amount is adjusted according to the number of kick seek tracks, and vibrations or resonance of the mechanism caused by subsidiarily moving the feed more than the lens deviation by kick seek are reduced, thereby realizing more stable tracking.

(Embodiment 3)

Figure 7:
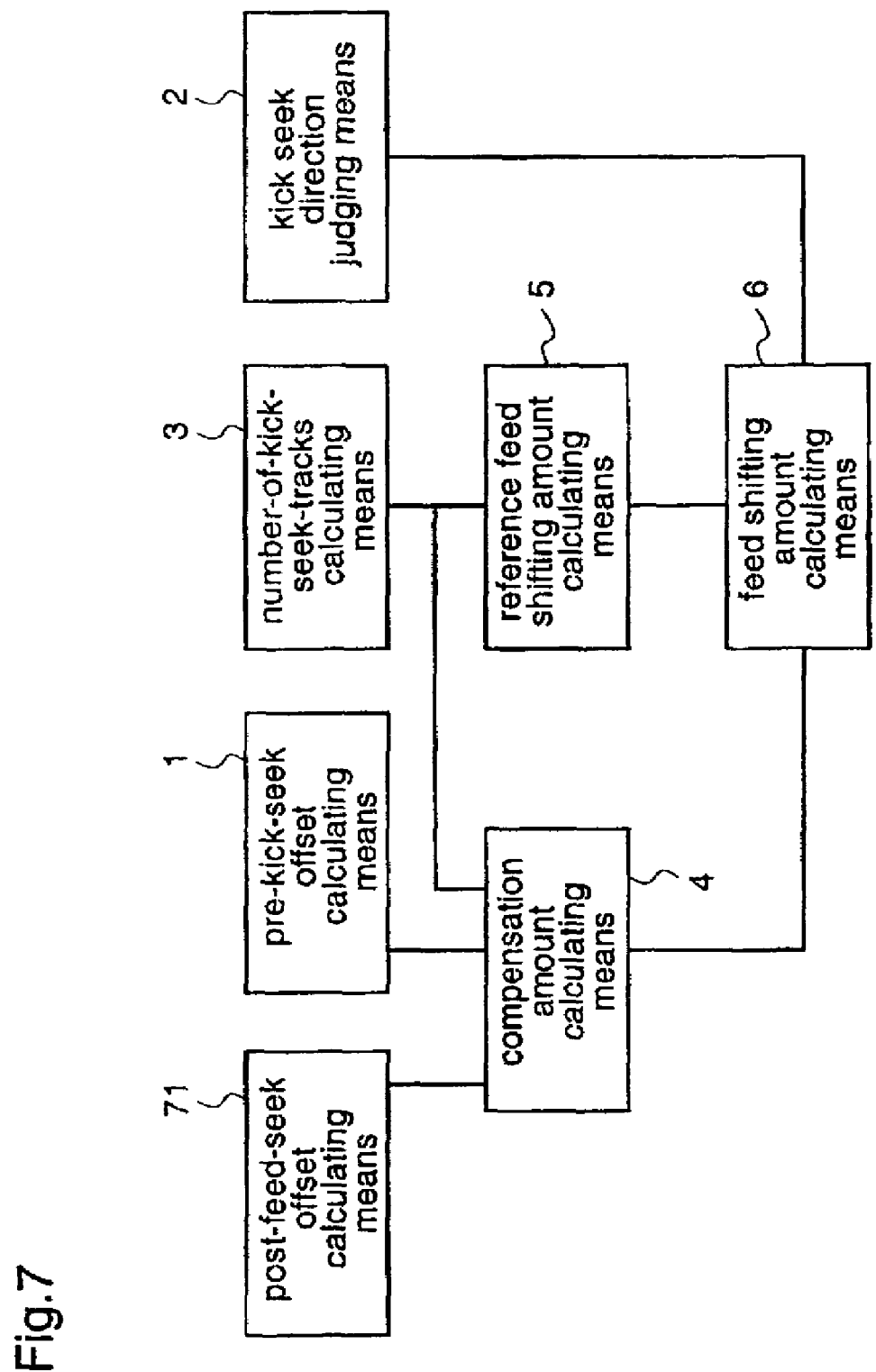
FIG. 7 is a block diagram illustrating a means for calculating a feed shifting amount of an optical disk apparatus according to a third embodiment of the present invention.

FIG. 7 is a block diagram illustrating a means for calculating a feed shifting amount of an optical disk apparatus according to a third embodiment of the present invention. In the figure, numeral 71 denotes a post-feed-seek offset calculating means for calculating an offset of a lens after feed seek, and this is implemented by software in the CPU.

A pre-kick-seek offset calculating means 1, a kick seek direction judging means 2, a number-of-kick-seek-tracks calculating means 3, a compensation amount calculating means 4, a reference feed shifting amount calculating means 5 and a feed shifting amount calculating means 6 in the optical disk apparatus according to the third embodiment are the same as those denoted by the same reference numerals in the optical disk apparatus according to the first embodiment.

Next, the operation will be described.

Just after the feed seek is ended, the post-feed-seek offset calculating means 71 receives data of the quantity of deviation of the lens 14 from the center of the housing of the pickup 13 from the analog front end IC 18, A/D-converts the data, thereby calculating an offset after the feed seek, and outputs the calculated offset to the compensation amount calculating means 4. Just before the kick seek starts, the pre-kick-seek offset calculating means 1 receives data of the quantity of deviation of the lens 14 from the center of the housing of the pickup 13 from the analog front end IC 18, A/D-converts the data, thereby calculating an offset before the kick seek, and outputs the calculated offset to the compensation amount calculating means 4. Simultaneously, the kick seek direction judging means 2 judges whether the direction of the kick seek is an inner radial direction or an outer radial direction on the basis of the current position and a target position of the lens 14, and outputs the obtained result to the feed shifting amount calculating means 6. On the other hand, the number-of-kick-seek-tracks calculating means 3 calculates the number of kick seek tracks that corresponds to a moving distance of the lens 14 on the basis of the present position and the target position of the lens 14, and outputs the obtained number to the reference feed shifting amount calculating means 5 and the compensation amount calculating means 4, just before the kick seek starts. The reference feed shifting amount calculating means 5 calculates a reference feed shifting amount on the basis of the number of kick seek tracks and outputs the amount to the feed shifting amount calculating means 6. The compensation amount calculating means 4 calculates a compensation amount by multiplying a difference between the offset before the kick seek and the offset after the feed seek by a coefficient which is proportional to the number of kick seek tracks, and outputs the compensation amount to the feed shifting amount calculating means 6. The feed shifting amount calculating means 6 adds the compensation amount and the reference feed shifting amount in the case of kick seek in the inner radial direction, while subtracting the compensation amount from the reference feed shifting amount in the case of kick seek in the outer periphery direction, thereby calculating a feed shifting amount. When the calculated feed shifting amount is smaller than 0, the feed shifting amount is outputted as 0.

Therefore, in the CPU 21 as a whole, assuming that "F" is the feed shifting amount, "F0" is the reference feed shifting amount, "offset1" is the offset after the feed seek, "offset2" is the offset before the kick seek, "δ" is the coefficient (δ=εT), "ε" is the coefficient, "T" is the number of kick seek tracks, the feed shifting amount has no polarity, and the polarity of the offset is "+" in the inner radial direction and "−" in the outer radial direction, a feed shifting amount at the kick seek is decided by the following expressions:

In the case of kick seek in the inner radial direction $$F=F0+\delta \text{ (offset2−offset1)} \quad (F=0, \text{ when } F0+\delta \text{ (offset2−offset1)}<0)$$

In the case of kick seek in the outer radial direction $$F=F0-\delta \text{ (offset2−offset1)} \quad (F=0, \text{ when } F0-\delta \text{ (offset2−offset1)}<0)$$

Next, the functions will be described with reference to FIGS. 8 and 9.

Figure 8A:
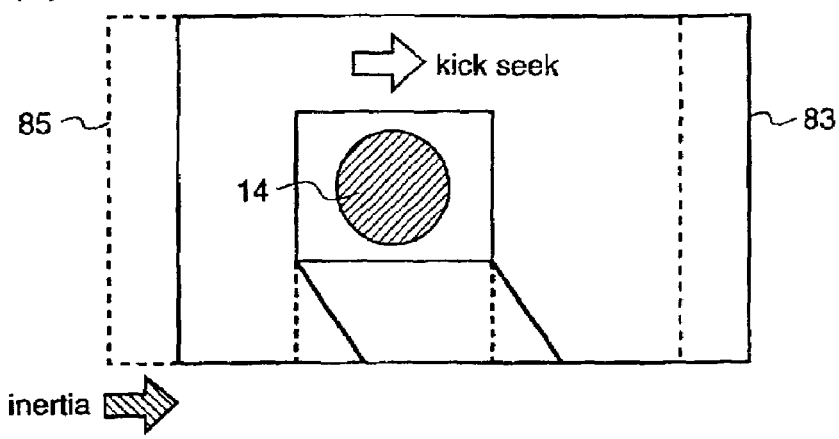
FIGS. 8(a)–8(c) are diagrams for explaining a case where kick seek is performed in an outer radial direction from a state where a movement resulting from inertia remains even when feed seek in the outer radial direction is ended in the third embodiment of the invention.
Figure 8B:
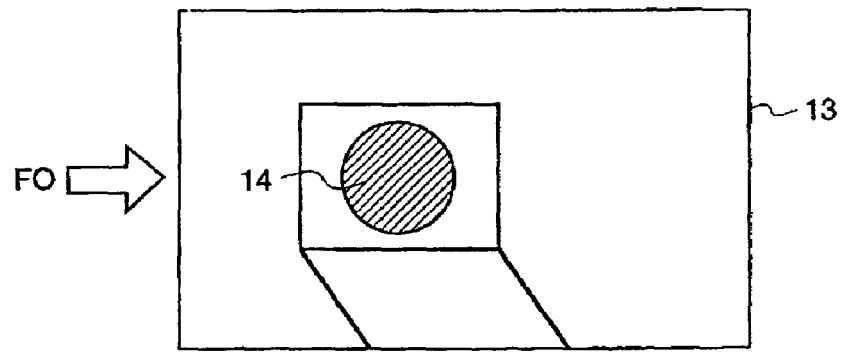
Figure 8C:
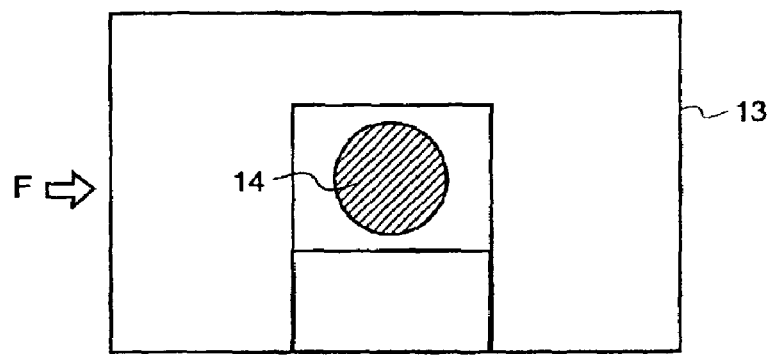

FIGS. 8(a)–8(c) are diagrams for explaining a case where the kick seek is performed in the outer radial direction from a state where a movement due to the inertia remains even after the feed seek in the outer radial direction is ended, in which FIG. 8(a) shows a state before the kick seek, FIG. 8(b) shows a state after kick seek by the reference feed shifting amount, and FIG. 8(c) shows a state after kick seek by the feed shifting amount. In the figure, numeral 83 denotes a position of the pickup just before the kick seek starts and numeral 85 denotes a position of the pickup just after the feed seek is ended, and FIG. 8(a) shows a case where the feed is moved due to the inertia in a short time from the end of feed seek till the start of kick seek.

When acceleration or deceleration of the feed seek is excessive, the movement of the feed may remain as the inertia even after the feed seek is ended. In this case, when kick seek by the reference feed shifting amount is performed, the amount of a subsidiary movement of the feed is excessive and the lens 14 is deviated as shown in FIG. 8(b). On the other hand, in the optical disk apparatus according to the third embodiment, the feed shifting amount F is smaller than the reference feed shifting amount F0 (0<F<F0). Thus, the lens 14 is located at the center of the pickup 13 as shown in FIG. 8(c). The same thing can be said of a case where the kick seek is performed in the inner radial direction from a state where the feed seek in the inner radial direction is ended.

Figure 9A:
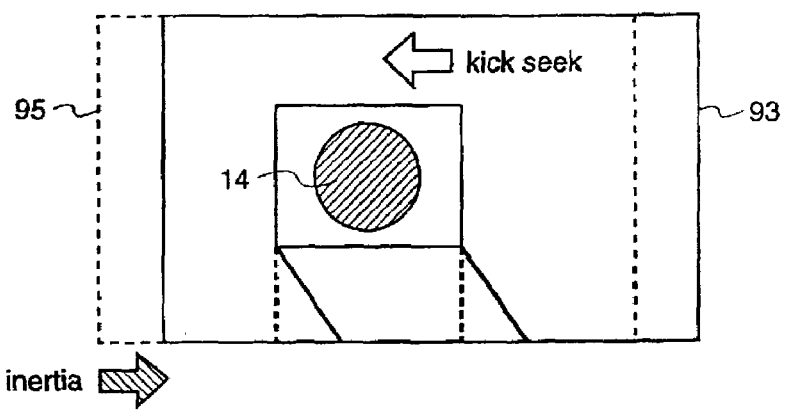
FIGS. 9(a)–9(c) are diagrams for explaining a case where kick seek is performed in an inner radial direction from a state where a movement resulting from inertia remains even when feed seek in an outer radial direction is ended in the third embodiment of the invention.
Figure 9B:
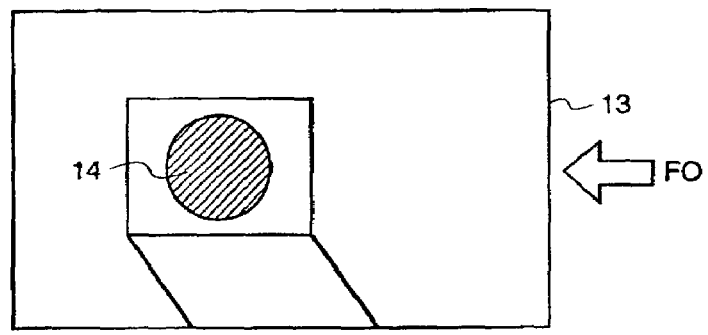
Figure 9C:
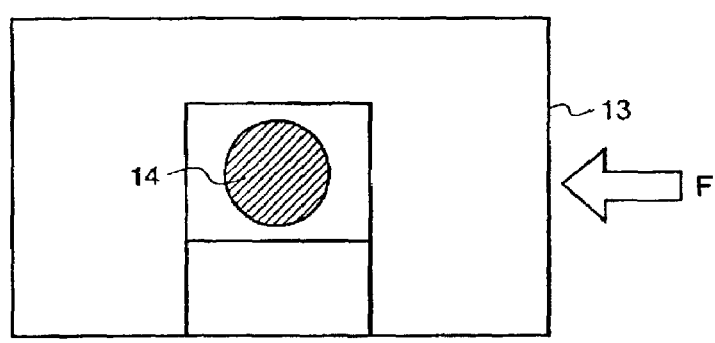
Figure 10:
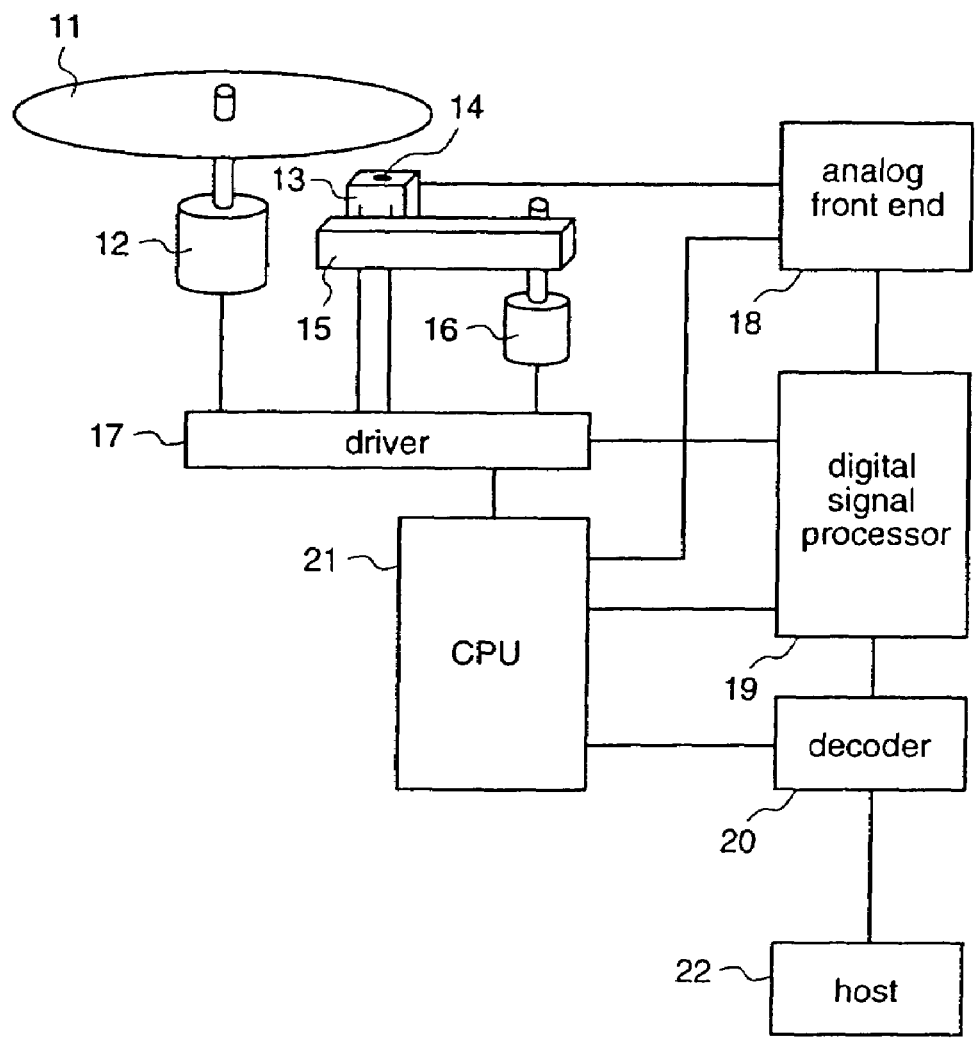
FIG. 10 is a schematic diagram illustrating a whole conventional optical disk apparatus.
Figure 11:
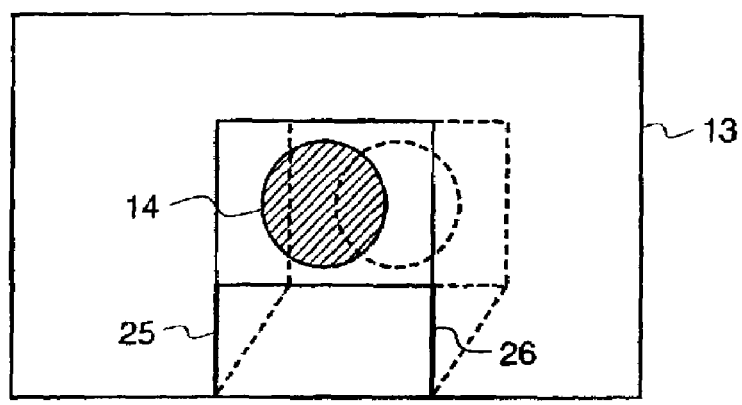
FIG. 11 is a diagram for explaining a structure of a pickup of an optical disk apparatus.
Figure 12:
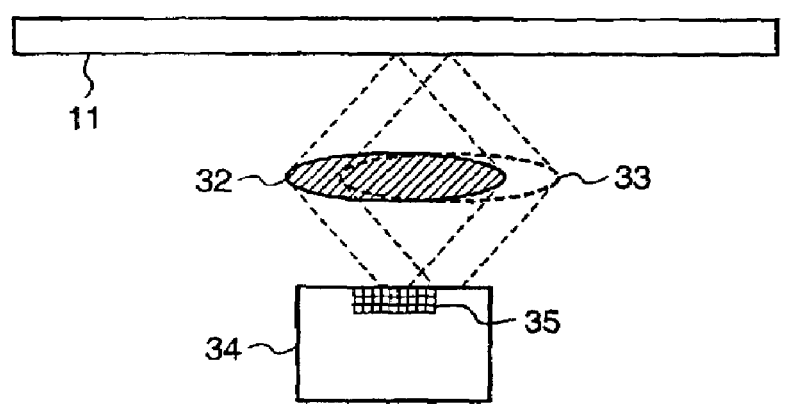
FIG. 12 is a diagram for explaining influences which are exerted by a deviation of a lens in a pickup upon data reading.
Figure 13A:
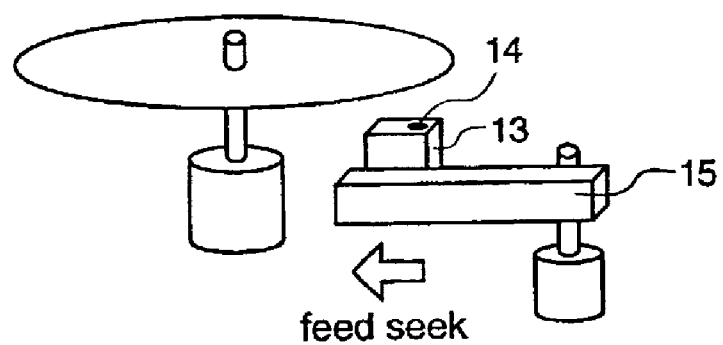
FIGS. 13(a) and 13(b) are diagrams for explaining positional changes of a lens at feed seek.
Figure 13B:
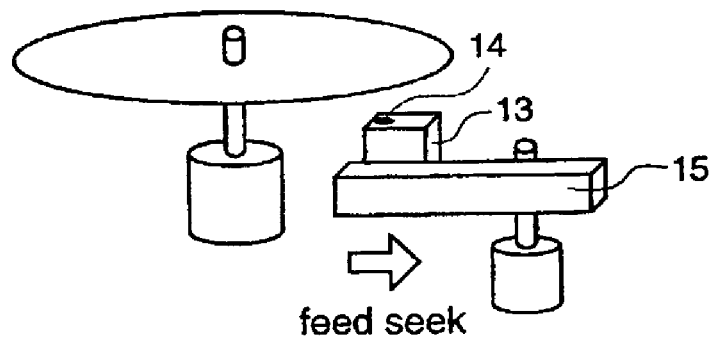
Figure 14A:
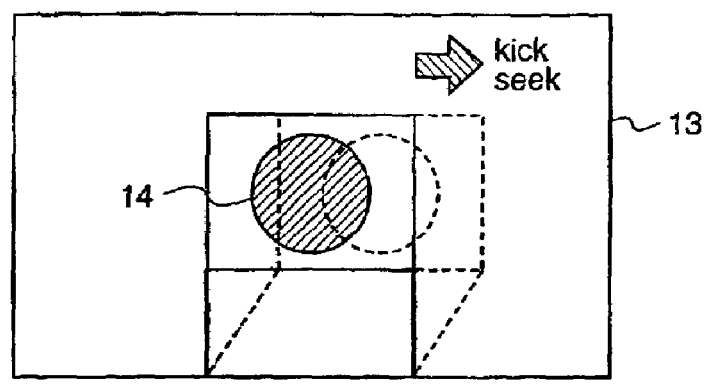
FIGS. 14(a) and 14(b) are diagrams for explaining positional changes of a lens at kick seek.
Figure 14B:
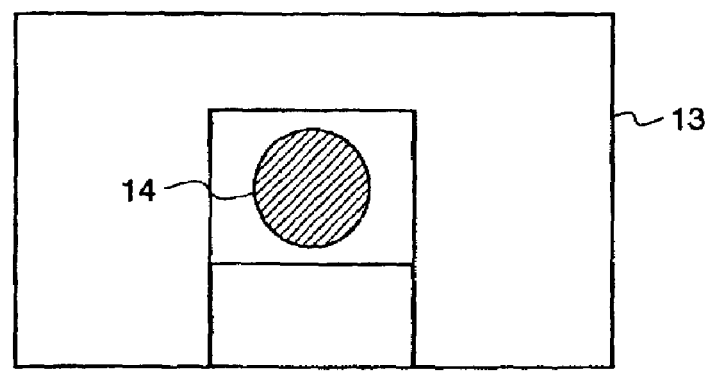
Figure 15:
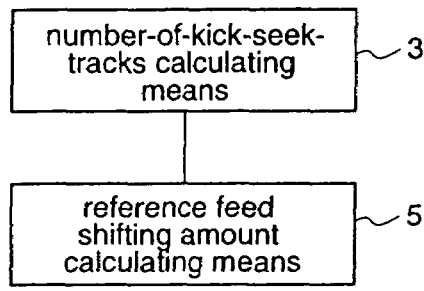
FIG. 15 is a block diagram illustrating a means for calculating a feed shifting amount in a CPU of the conventional optical disk apparatus.
Figure 16A:
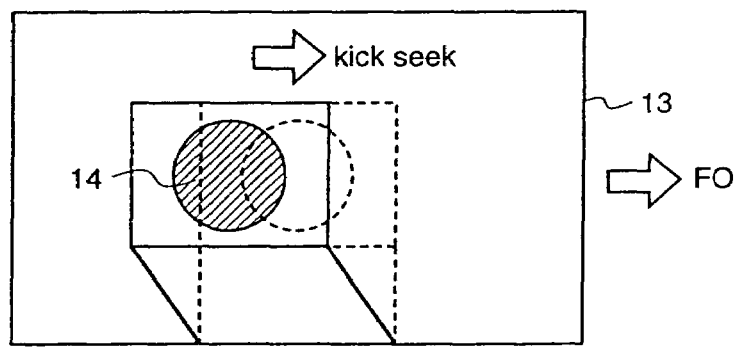
FIGS. 16(a) and 16(b) are diagrams for explaining problems of kick seek from a state where a lens is deviated.
Figure 16B:
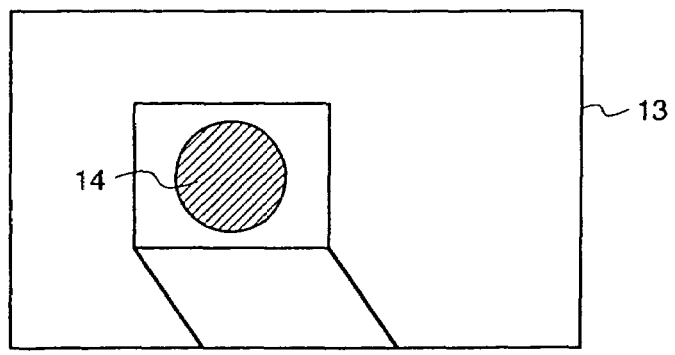
Figure 17A:
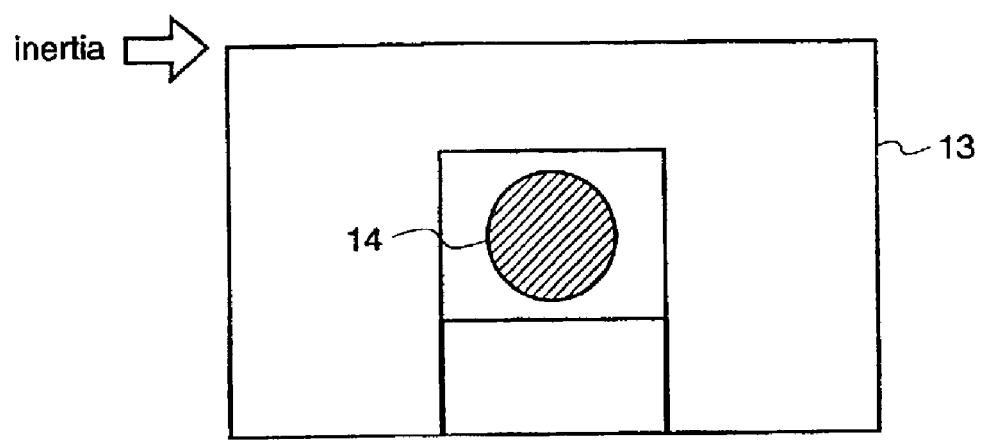
FIGS. 17(a) and 17(b) are diagrams for explaining problems of kick seek from a state where a feed keeps moving by the inertia of feed seek.
Figure 17B:
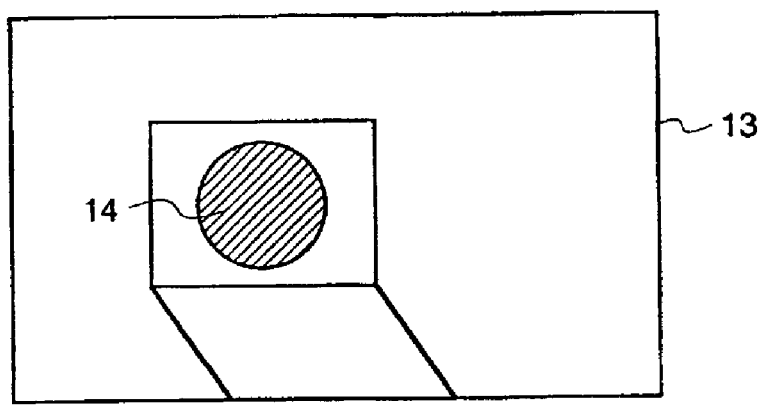

FIGS. 9(a)–9(c) are diagrams for explaining a case where kick seek is performed in the inner radial direction from a state where a movement due to the inertia remains even after feed seek in the outer radial direction is ended, in which FIG. 9(a) shows a state before kick seek, FIG. 9(b) shows a state after kick seek by the reference feed shifting amount, and FIG. 9(c) shows a state after kick seek by the feed shifting amount. In the figure, numeral 93 denotes a position of the pickup just before the kick seek starts and numeral 95 denotes a position of the pickup just after the feed seek is ended, and FIG. 9(a) shows a case where the feed is moved due to the inertia in a short time from the end of feed seek till the start of the kick seek.

In a case where the movement of the feed remains as the inertia even after the feed seek is ended, when kick seek by the reference feed shifting amount is performed, the amount of feed movement due to the inertia and the reference feed shifting amount cancel each other and the lens 14 is deviated according to the amount of movement of the lens 14 at the kick seek, as shown in FIG. 9(b). On the other hand, in the optical disk apparatus according to the third embodiment, the feed shifting amount F is larger than the reference feed shifting amount F0 (0<F0<F). Thus, the lens 14 is located at the center of the pickup 13 as shown in FIG. 9(c). The same thing can be said of a case where the kick seek is performed in the outer radial direction from a state where feed seek in the inner radial direction is ended.

As described above, the optical disk apparatus according to the third embodiment of the invention calculates a feed shifting amount on the basis of the lens offset just before kick seek starts, the lens offset just after the end of feed seek before the kick seek, the direction of the kick seek and the number of tracks on an optical disk by which the lens is moved by the kick seek, and subsidiarily moves the feed by the feed shifting amount in concurrence with the kick seek. Therefore, the lens is located at the center in the housing of the pickup after the kick seek even when the movement of feed seek remains as the inertia, whereby subsequent tracking can be performed stably.

Further, in the optical disk apparatus according to the third embodiment of the invention, the absolute value of the compensation amount is smaller than the absolute value of the reference feed shifting amount. Therefore, the lens does not move in a direction opposite to the direction of the pickup movement at the kick seek and the relative velocity between the lens and the pickup is reduced, thereby realizing more stable tracking.

Further, in the optical disk apparatus according to the third embodiment of the invention, the compensation coefficient at the calculation of the compensation amount is proportional to the number of kick seek tracks. Therefore, when the number of kick seek tracks is small and the seek operation is continued, the feed shifting amount is adjusted according to the number of kick seek tracks, so that vibrations or resonance of the mechanism caused by the subsidiary movement of the feed larger than the lens deviation by the kick seek are reduced, resulting in more stable tracking.

APPLICABILITY IN INDUSTRY

As described above, the optical disk apparatus according to the present invention is suited to perform stable tracking.

The invention claimed is:

1. An optical disk apparatus for moving a feed when data is read from an arbitrary position on an optical disk surface, thereby performing a tracking control, said optical disk apparatus comprising:

a number-of-feed-seek-tracks calculator operable to calculate a number of tracks on an optical disk by which a lens is to be moved by a feed seek before a kick seek;

a kick seek direction judger operable to judge whether a direction of the kick seek is an inner radial direction or an outer radial direction on the basis of a current position and a target position of the lens just before the kick seek starts;

a number-of-kick-seek-tracks calculator operable to calculate a number of tracks on an optical disk by which the lens is moved by the kick seek;

a reference feed shifting amount calculator operable to calculate a reference feed shifting amount on the basis of the number of tracks calculated by said number-of-kick-seek-tracks calculator;

a compensation amount calculator operable to calculate a compensation amount by multiplying the number of tracks calculated by said number-of-feed-seek-tracks calculator by a compensation coefficient;

a feed shifting amount calculator operable to add the compensation amount and the reference feed shifting amount when the direction is judged to be the inner radial direction by said kick seek direction judger, and to subtract the compensation amount from the reference feed shifting amount when the direction is judged to be the outer radial direction, thereby calculating a feed shifting amount; and a controller operable to subsidiarily move the feed by the feed shifting amount in concurrence with the kick seek.

2. The optical disk apparatus as defined in claim 1, wherein said compensation amount calculator is operable to set the compensation amount such that a direction of reference feed shifting does not change when the compensation amount is added to or subtracted from the reference feed shifting amount by said feed shifting amount calculator.

3. The optical disk apparatus as defined in claim 1, wherein said compensation amount calculator is operable to calculate the compensation amount such that the compensation coefficient is proportional to the number of tracks calculated by said number-of-kick-seek-tracks calculator.

* * * * *